United States Patent
Pirooz et al.

(10) Patent No.: US 8,462,903 B2
(45) Date of Patent: Jun. 11, 2013

(54) IN-BAND INTERFERENCE REJECTION OF SIGNALS IN ALTERNATE AND ADJACENT CHANNELS

(75) Inventors: Ali Dolatshahi Pirooz, Fremont, CA (US); Hendricus De Ruijter, Sunnyvale, CA (US)

(73) Assignee: Silicon Laboratories Inc., Austin, TX (US)

( * ) Notice: Subject to any disclaimer, the term of this patent is extended or adjusted under 35 U.S.C. 154(b) by 549 days.

(21) Appl. No.: 12/642,013

(22) Filed: Dec. 18, 2009

(65) Prior Publication Data
US 2011/0150155 A1 Jun. 23, 2011

(51) Int. Cl.
*H04B 1/10* (2006.01)
(52) U.S. Cl.
USPC ........... 375/350; 375/340; 375/346; 375/285; 455/188.1; 455/307; 455/296
(58) Field of Classification Search
USPC ............... 375/350, 285, 346, 340; 455/188.1, 455/307, 296
See application file for complete search history.

(56) References Cited

U.S. PATENT DOCUMENTS

| | | | |
|---|---|---|---|
| 6,178,314 B1 * | 1/2001 | Whikehart et al. | 455/188.1 |
| 7,149,407 B1 * | 12/2006 | Doerr et al. | 385/147 |
| 2005/0164649 A1 * | 7/2005 | Nakatani et al. | 455/84 |

OTHER PUBLICATIONS

IEEE Standard for Information Technology—Telecommunications and Information Exchange Between Systems—Local and Metropolitan Area Networks—Specific Requirements, Part 15.4: Wireless Medium Access Control (MAC) and Physical Layer (PHY) Specifications for Low-Rate Wireless Personal Area Networks (WPANs); IEEE Std 802.15.4™-2006 (Revision of IEEE Std 802.15.4-2003); Sep. 8, 2006, pp. 0_1-305 (323 pages).

* cited by examiner

*Primary Examiner* — Phuong Phu
(74) *Attorney, Agent, or Firm* — Abel Law Group, LLP

(57) ABSTRACT

A method includes filtering a received signal to generate a band-pass filtered signal using a band-pass filter having a pass-band including frequencies located within a central lobe of a power spectrum associated with a target channel of a plurality of channels supported by a communications system. The pass-band is approximately centered at a frequency of a null of a power spectrum associated with at least one other channel of the plurality of channels supported by the communications system. The method includes processing the received signal based on the band-pass filtered signal. The at least one other channel may include at least one of an alternate channel and an adjacent channel of the plurality of channels.

18 Claims, 9 Drawing Sheets

IN-BAND INTERFERENCE REJECTION OF SIGNALS IN ALTERNATE AND ADJACENT CHANNELS

BACKGROUND

1. Field of the Invention

This invention relates to communications systems and more particularly to reducing interference between communications systems.

2. Description of the Related Art

A typical communications system receiver is configured to receive signals communicated by a transceiver using a target channel that occupies a particular frequency band of a power spectrum. When other nearby transceivers are configured to operate using other communications channels of the frequency band, the power spectrum associated with the other communications channels may include energy in frequencies that overlap a frequency band of the target channel. Processing of a received signal by the communications system based on detection of energy from signals communicated over the other channels can degrade the performance of the communications system receiver.

SUMMARY

In at least one embodiment of the invention, a method includes filtering a received signal to generate a band-pass filtered signal using a band-pass filter having a pass-band including frequencies located within a central lobe of a power spectrum associated with a target channel of a plurality of channels supported by a communications system. The pass-band is approximately centered at a frequency of a null of a power spectrum associated with at least one other channel of the plurality of channels supported by the communications system. The method includes processing the received signal based on the band-pass filtered signal. The at least one other channel may include at least one of an alternate channel and an adjacent channel of the plurality of channels.

In at least one embodiment of the invention, an apparatus includes a band-pass filter configured to generate a band-pass filtered version of a received signal having a pass-band including frequencies located within a central lobe of a power spectrum associated with a target channel of a plurality of channels supported by a communications system and approximately centered at a frequency of a null of a power spectrum associated with at least one other channel of the plurality of channels supported by a communications system. The apparatus includes a control circuit configured to generate an indicator of whether the received signal is received over the target channel at least partially based on a power level of the band-pass filtered version of the received signal and a power level of the received signal.

In at least one embodiment of the invention, a method includes determining whether a received signal is received over a target channel of a plurality of channels supported by a communications system and at least partially based on a power level of a band-pass filtered version of the received signal. The method includes demodulating the received signal according to the determination.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1A:
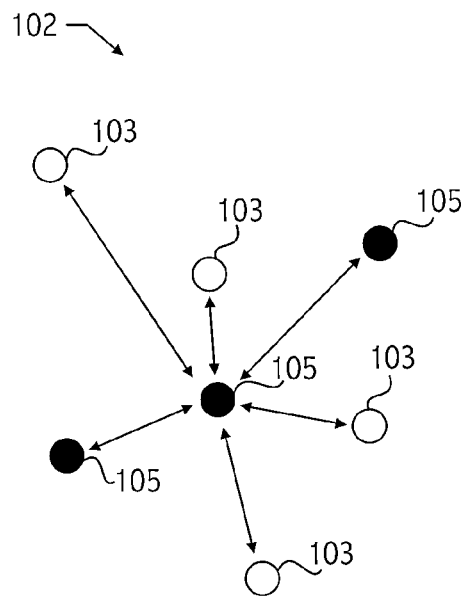
FIGS. 1A and 1B illustrate exemplary communications networks.
Figure 1B:
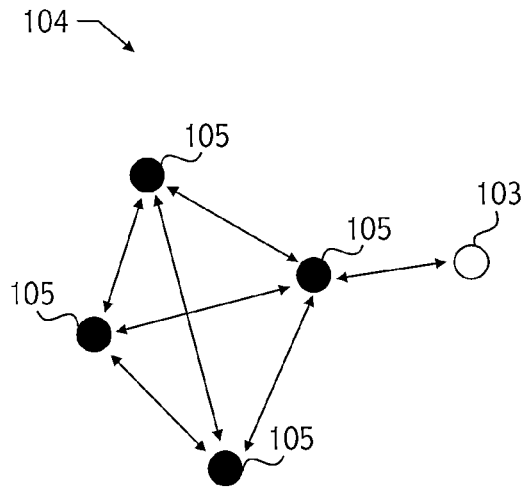

Referring to FIGS. 1A and 1B, an exemplary communications network (e.g., communications network 102 or communications network 104) is a low-cost, short-range operation communications network that provides wireless connectivity in low-power, relatively low data rate applications (e.g., 250 kilobits per second (kbps)) and may be a low-rate wireless personal area network compliant with the Institute of Electrical and Electronics Engineers (IEEE) Standard for Information Technology—Telecommunications and information exchange between systems—Local and metropolitan area networks—Specific requirements Part 15.4: Wireless Medium Access Control (MAC) and Physical Layer (PHY) Specifications for Low-Rate Wireless Personal Area Networks (WPANs) (IEEE Standard 802.15.4). In at least some embodiments, the communications network is configured in combinations of devices (e.g., full function devices 105, which include a personal area network coordinator and reduced function devices 103) in a star network topology (e.g., communications system 102), a peer-to-peer network topology (e.g., communications system 104), or other suitable topology.

In general, the communications network is configured to operate in a particular frequency band (e.g., 2450 MHz band, 915 MHz band, or 868 MHz band). The network devices (e.g., devices 103 and 105) are configured to support all channels specified for the frequency band of operation (e.g., 16 channels in a 2450 MHz band, 30 channels in a 915 MHz band, or three channels in an 868 MHz band). A particular personal area network communicates over a target channel in a frequency band, but multiple wireless personal area networks may be operating simultaneously over different channels specified for that frequency band in a personal operating space.

Figure 2:
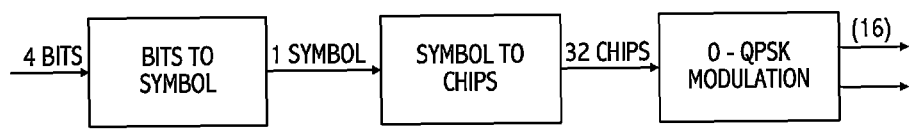
FIG. 2 illustrates a functional block diagram of an exemplary IEEE 802.15.4 QPSK modulation and spreading technique.

Referring to FIG. 2, an exemplary device of communications systems 102 and 104 operates using a 2450 MHz physical layer with a data rate of 250 kb/s. The communications system, which is compliant with IEEE Standard 802.15.4, uses a chip rate of 2 MHz by mapping every four bits of 250 kbps of data to a symbol. Each symbol is mapped to 32 chips (Tc). Offset quadrature phase-shift keying modulation rearranges the 32 chips as 16 in-phase (I-phase) and 16 quadrature-phase (Q-phase) representations of the data. Each I-phase and Q-phase pulse has a period of 2*Tc. Note that the frequency band and data rate are exemplary only, and techniques described herein may apply to other configurations.

Figure 3:
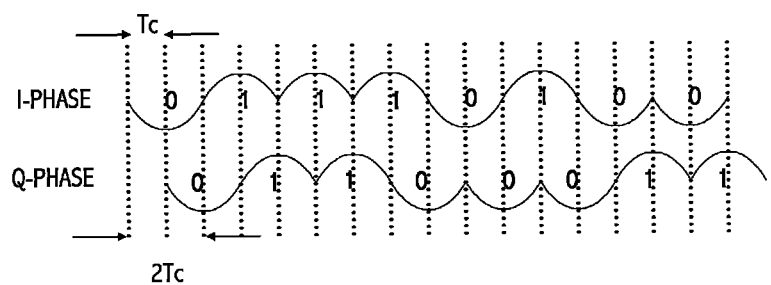
FIG. 3 illustrates exemplary waveforms of baseband chip sequences with pulse shaping.

Referring to FIG. 3, Q-phase chips are delayed by Tc with respect to the I-phase chips to form O-QPSK modulation. Every pulse of I-phase and Q-phase is then replaced with half-sine wave shaping. The complex O-QPSK sequence is given as:

$$x(t) = \sum_k a(k) f(t - 2kTc) + j \sum_k b(k) f(t - 2kTc - Tc),$$

where a(k) and b(k)∈{−1, +1} with $$\begin{cases} f(t) = \sin\left(\frac{\pi}{2Tc}\right), & 0 \le t \le 2Tc \\ f(t) = 0, & \text{elsewhere.} \end{cases}$$

Figure 4:
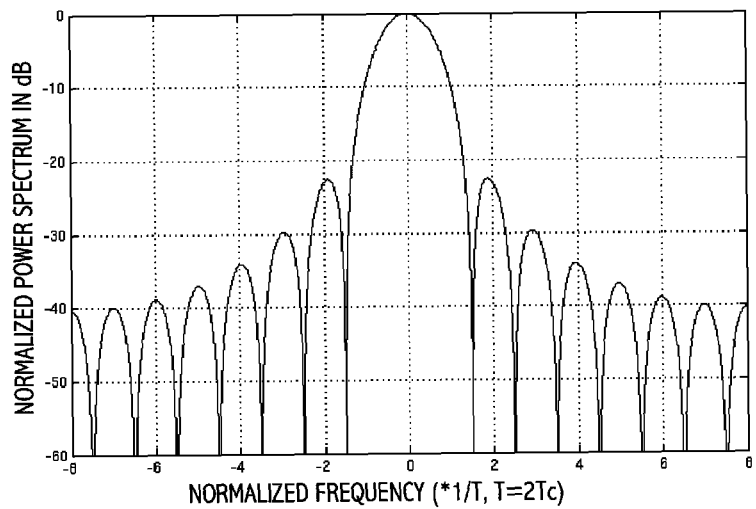
FIG. 4 illustrates an exemplary power spectrum consistent with IEEE 802.15.4 QPSK modulation and spreading.
Figure 5:
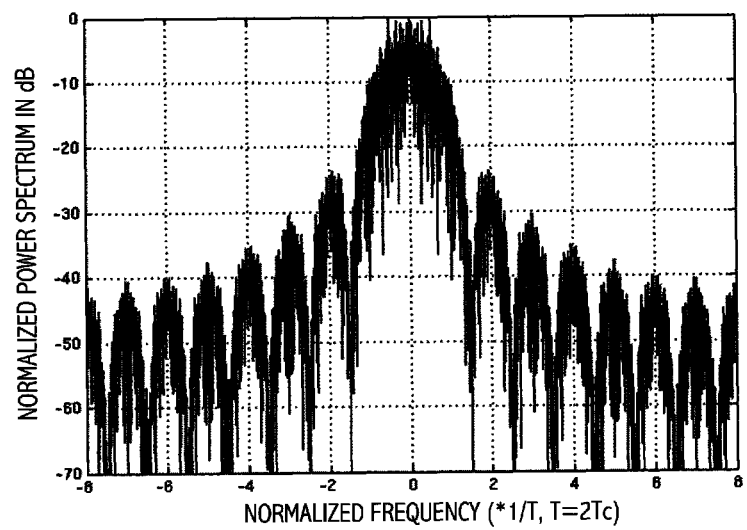
FIG. 5 illustrates an exemplary power spectrum consistent with a random half-sinc pulse shape sequence.

A resulting power spectrum of half-sine pulse shape is illustrated in FIG. 4 for a sampling rate of 16/(2Tc). A power spectrum of a random sequence of half-sine pulse shape is illustrated in FIG. 5.

Figure 6:
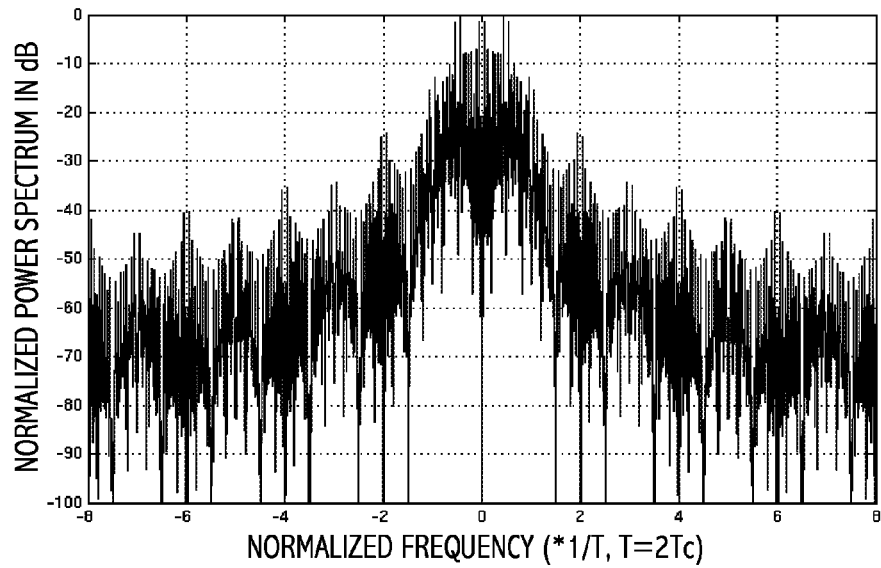
FIG. 6 illustrates an exemplary power spectrum of a random sequence.

An exemplary IEEE Standard 802.15.4 compliant system implements 16 different combinations of four bits. Each combination presents one symbol equivalent to 32 chips. The symbols are chosen such that DC is zero. The power spectrum of a random sequence of symbols is illustrated in FIG. 6. Note that in the IEEE Standard 802.15.4, only 16 symbols exist, each presenting one pattern of 32 chips. Accordingly, randomization is not per chip, but rather, per symbol.

Figure 7:
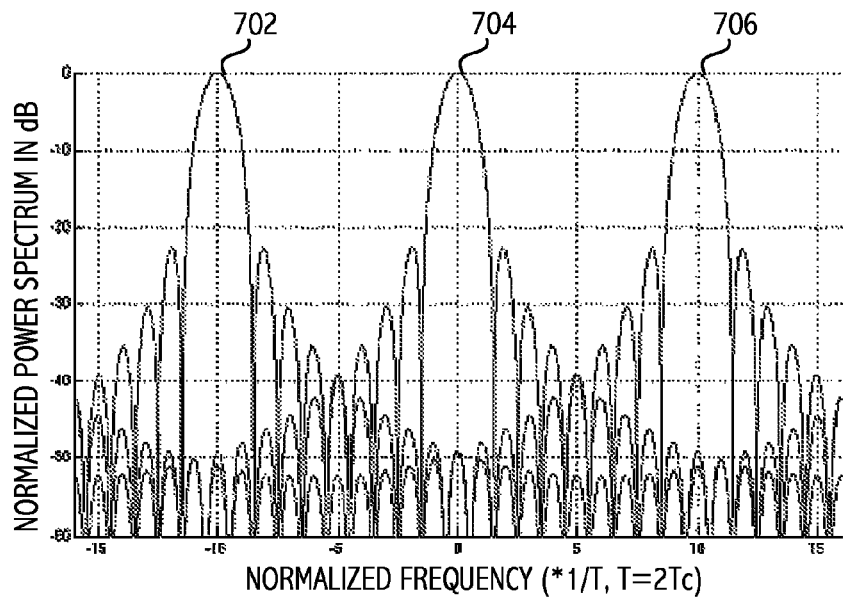
FIG. 7 illustrates exemplary power spectrums of a target channel and alternate channels consistent with an exemplary communications system.

Referring to FIG. 7, as described above, a particular frequency band includes multiple channels. As referred to herein, an adjacent channel is a channel on either side of a target channel that is closest in frequency to the target channel. As referred to herein, an alternate channel is one channel more removed from the adjacent channel. In at least one embodiment, a communications system is configured to operate in a 2450 MHz frequency band, including 16 channels. When channel 13 is a target channel, channel 12 and channel 14 are the adjacent channels, and channel 11 and channel 15 are the alternate channels. The center frequencies of the adjacent channels are located at +/−5 MHz from the center frequency of the target channel. The center frequencies of the alternate channels are located at +/−10 MHz from the center frequency of the target channel. A tenth lobe of an alternate channel power spectrum (e.g., power spectrum 702 and power spectrum 706) is located in frequencies of the target channel, which has a power spectrum (e.g., power spectrum 704) centered at a normalized frequency of 0 Hz, where frequency is normalized to a frequency associated with a period of T=2Tc for a sampling rate of 32/(2Tc).

Although a device is configured to operate using a target channel of a particular frequency band, nearby devices may communicate over the alternate and adjacent channels of the frequency band. The communications device may experience interference in the target channel as a result of communications in one or more of the alternate and adjacent channels. In at least one embodiment of a communications device, in the absence of a signal received over the target channel, if a communications device receives the signal over an alternate channel having a tenth lobe above the sensitivity of the communications device, then the received signal could be mistakenly considered as received over the target channel by the communications device and the communications device demodulates the received signal. To achieve a target selectivity, signal-to-noise ratio requirements are implemented. In at least one embodiment, the communications device is configured to detect whether a signal is received over a target channel or over alternate or adjacent channels at all possible operating points of the signal-to-noise ratio.

In at least one embodiment of a communications system, an amplitude spectrum of the tenth lobe of an alternate channel and all other even lobes resembles the amplitude spectrum of the target channel. However, even lobes substantially attenuated at nulls are comparable to the target channel at the same frequencies. If a receiver of the communications system only receives a signal over an alternate channel that has a tenth lobe power above the receiver sensitivity, then the receiver will mistakenly detect the received signal as being received over the target channel and the receiver demodulates the received signal.

Figure 8:
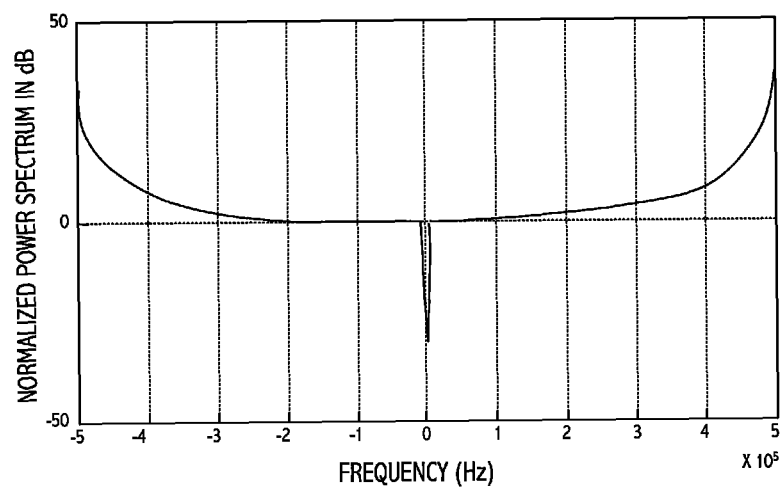
FIG. 8 illustrates exemplary power spectrum ratio of portions of a target channel and an alternate channel consistent with an exemplary communications system.

Referring to FIG. 8, in an exemplary communications system having a sampling rate of 16/(2Tc), where Tc=0.5 μs, the difference between the logarithmic rescaled power spectrums of the target channel to the alternate channel (e.g., power spectrum difference 800) illustrates the similarities of those signals received over channels between 0 Hz and +/−200 kHz. However, for frequencies outside the 200 kHz band from the center frequency of the target channel, the amplitude of the tenth lobe of the alternate channel attenuates and substantially decreases at approximately 500 kHz from the center frequency of the target channel. Thus, the logarithmic power spectrum difference is flat up to approximately 200 kHz and increases substantially at approximately 500 kHz.

In at least one embodiment of a communications receiver, to distinguish between a signal received over the target channel and a signal received over another channel signal (e.g., alternate channel), a band-pass filter is applied to the received signal and the energy remaining in the pass-band after filtering is used to determine whether the received signal is received over a target channel or another channel. As referred to herein, a received signal is a signal received over the air interface e.g., after an analog-to-digital converter, decimation filters, and a channel selectivity filter, but prior to demodulation.

Figure 9:
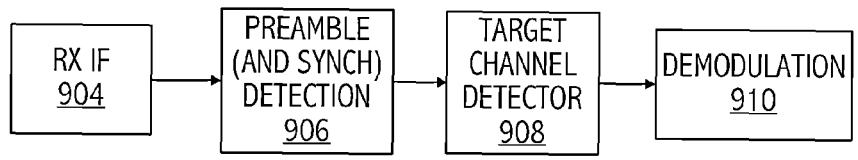
FIG. 9 illustrates an exemplary receiver consistent with at least one embodiment of the invention.
Figure 10:
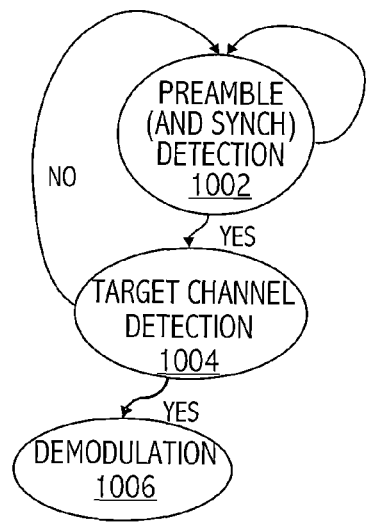
FIG. 10 illustrates exemplary information and control flows of the receiver of FIG. 9 consistent with at least one embodiment of the invention.

Referring to FIGS. 9 and 10, in at least one embodiment, a communications receiver (e.g., receiver 900) includes a wireless receiver interface (e.g., receive interface 904) that receives a signal, converts the received signal into digital form and then filters and decimates the received signal. A detector (e.g., preamble detector and synchronization 906) performs chip and symbol synchronization based on the incoming message (1002). In at least one embodiment, the detector performs chip and symbol synchronization based on preamble and synch fields of an incoming message. If the preamble detection and synchronization are performed successfully, then another detector (e.g., target channel detector 908) determines whether the received signal is received over a target channel (1004). If a signal received over a target channel is detected, then a demodulator (e.g., demodulator 910) demodulates the received signal (1006). If the digital functions of receiver 900 are performed in firmware using a digital signal processor to implement the functions of preamble detector and synchronization 906, target channel signal detector 908, and demodulator 910, then these functions are performed serially. However, in other embodiments of a receiver, at least some of those functions are performed in a different order, e.g., at least some functions of receiver 900 are performed in parallel using dedicated hardware circuits configured to perform those functions.

Figure 11:
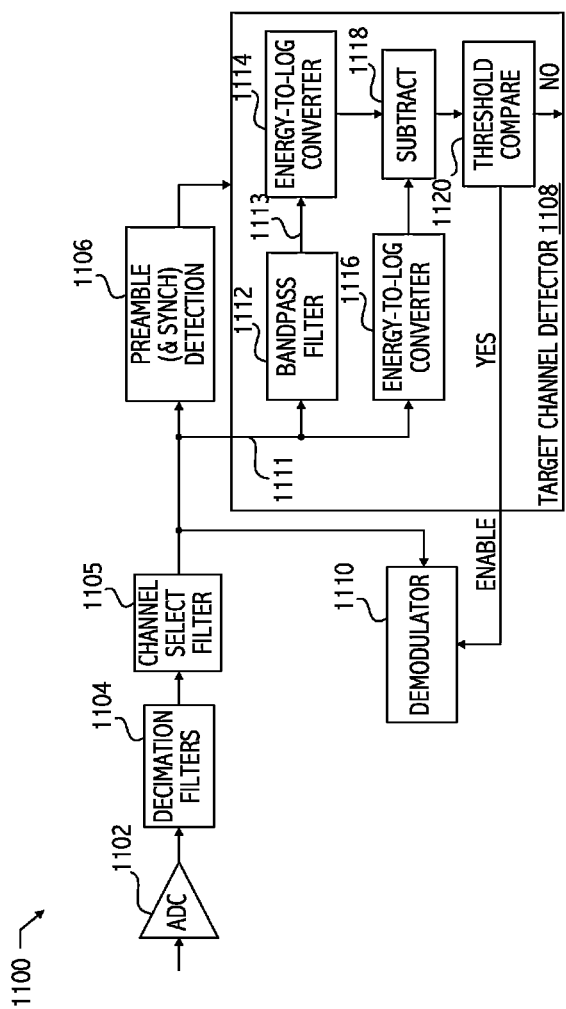
FIG. 11 illustrates an exemplary receiver consistent with at least one embodiment of the invention.

Referring to FIG. 11, in at least one embodiment of a receiver (e.g., receiver 1100), a dedicated preamble detection and synchronization function executes in parallel with target channel detection. For example, target channel detector 1108 is implemented using dedicated hardware circuits, while preamble detection and synchronization block 1106 is implemented using either dedicated hardware circuits and/or a digital signal processor configured to execute firmware that performs the functions of preamble detection and synchronization. The results of the target signal detector are used after preamble detection and synchronization completes. If the preamble detection and synchronization are successful, then the output of the target channel detector is considered to ensure that the detected signal is received over the target channel. Accordingly, when target channel detector 1108 determines that the signal is not received over a target channel, demodulation target channel detector 1108 disables demodulation sooner than if the target channel detection occurs in serial with the preamble detection and synchronization operation.

In an embodiment where the receiver uses a digital signal processor core to perform the functions of receiver 900, then the data is buffered and followed by the preamble detection and synchronization process. Since the calculations are performed serially, then the suitable location for the target channel detector is after preamble detection and synchronization on the data in the current buffer. In at least one embodiment (e.g., embodiments where there are not enough cycles to perform the three processes in the same buffer), target channel detection is performed after preamble detection. The target channel detector recognizes whether or not the received signal is received over the target channel and demodulates the packet or drops the packet prior to demodulation accordingly.

Referring to FIGS. 9 and 11, in at least one embodiment, a target channel detector (e.g., target channel detector 908 or target channel detector 1108) receives a version of the received signal (e.g., signal 1111) and provides that signal to a band-pass filter (e.g., band-pass filter 1112), which generates a band-pass filtered version of the received signal (e.g., signal 1113). The target channel detector compares the version of the received signal to the band-pass filtered version of the received signal to determine whether the received signal is received over the target channel. In at least one embodiment of a target channel detector, the energy in the two versions of the received signal are compared to each other. The ratio of the energy in the received signal to the energy in the band-pass filtered version of the received signal should be much smaller when the received signal is received over a target channel as compared to when the received signal is received over an alternate channel. If the ratio of the total energy in the received signal as compared to the total energy in the band of interest (i.e., the total energy in the band-pass filtered version of the received signal) is below a threshold value, then the target channel detector generates a signal indicating that the signal is received over the target channel. If the ratio of the total energy in the received signal as compared to the total energy in the band of interest exceeds a threshold value, then the target channel detector generates a signal indicating that the signal is received over an alternate or adjacent channel.

In at least one embodiment, a target channel detector determines the ratio of the energy in the received signal to the energy in the band-pass filtered version of the signal by dividing the total energy level of the received signal by the total energy level of the band-pass filtered version of the signal. In at least one embodiment, a target channel detector determines the ratio of the total energy in the received signal to the total energy in the band of interest by converting the power spectrum energy levels into a logarithmic scale (e.g., decibels, i.e., dB) by any suitable technique. For example, energy-to-log converter 1114 and energy-to-log converter 1116 generate versions of the total energy level of the received signal in dB and the total energy level of the band-pass filtered version of the received signal in dB, respectively. Then, subtract circuit 1118 subtracts one of the total energy levels in dB from the other total energy level in dB to thereby determine the ratio (e.g., subtracts the energy level of the band-pass filtered version of the signal in dB from the energy level of the received signal in dB). Threshold compare block 1120 compares the difference to a threshold and sets a demodulator enable signal, a target channel detect flag stored in control register, or other suitable indicator of whether the signal is received over a target channel, accordingly. In at least one embodiment of a receiver, the threshold value is a predetermined constant value, which may be a threshold value that in simulation results in a relatively high or maximum number of rejections of signals received over alternate and adjacent channels for various system signal-to-noise ratios. In at least one embodiment of a receiver, the threshold is adaptively adjusted according to the energy of the received signal, e.g., energy of the signal after analog-to-digital converter 1102, decimation filters 1104, and channel select filter 1105. If a signal received over a target channel is detected, then the signal is demodulated to recover a payload. If a signal received over a target channel signal is not detected, (e.g., the signal is received over an alternate or adjacent channel), then the packet is dropped and a next packet is evaluated.

As described above, in an IEEE 802.15.4 compliant system, adjacent channels occur at +/−5 MHz with respect to the center frequency of the target channel. The fifth lobe of an adjacent channel falls in the wanted band centered at 0 Hz. The amplitude behavior of the adjacent channel in frequency differs from the amplitude behavior of the target channel. However, in the absence of a signal received over the target channel, the preamble of a signal received over the adjacent channel may be detected and the receiver begins demodulating the received channel. Although the demodulation would eventually fail, time is wasted and the receiver may lose a packet of a signal that should be received over the target channel. The same technique used to distinguish a signal received over the target channel from a signal received over an alternate channel can also be used for rejecting a signal received over an adjacent channel signal (e.g., reject the fifth lobe of the adjacent channel). The technique rejects packets received over the adjacent channel after preamble detection and synchronization, prior to demodulating the data.

Figure 12:
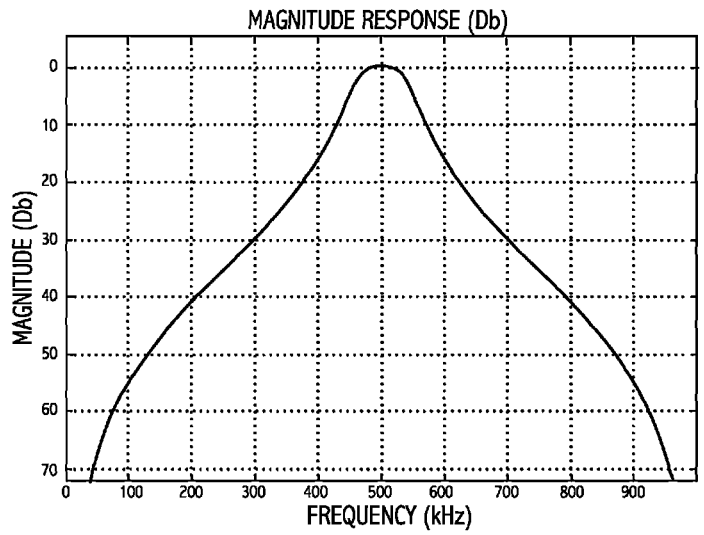
FIG. 12 illustrates a magnitude response of a band-pass filter consistent with at least one embodiment of the invention.
Figure 13:
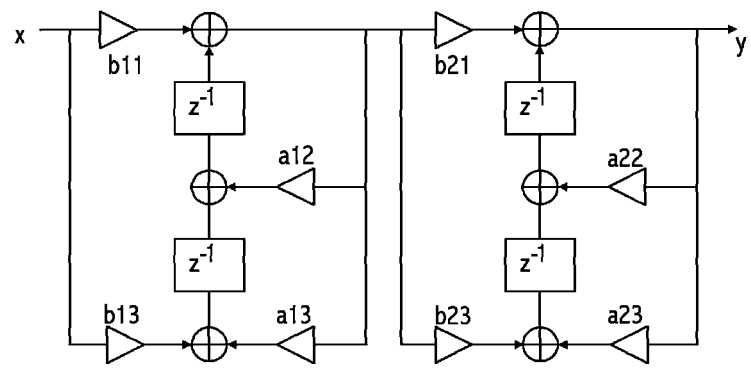
FIG. 13 illustrates a functional block diagram of an exemplary band-pass filter consistent with at least one embodiment of the invention.

Referring to FIGS. 12 and 13, an exemplary band-pass filter 1112 is an infinite impulse response filter, which may be implemented using a minimum number of taps to conserve power, although any suitable number of taps may be used. In at least one embodiment, the band-pass filter is a fourth order Butterworth filter that is divided into two sections of order two. The pass-band (i.e., frequency band of interest) is centered at 500 kHz and the bandwidth is 84 kHz, which is approximately 4% of the target signal bandwidth. The 3 dB bandwidth approximately coincides with the location where attenuation of the tenth lobe power of the alternate channel power spectrum compared to the 0 Hz power of the target channel power spectrum is approximately 16 dB. In at least one embodiment, the band-pass filter has a 3 dB point at a corresponding frequency where a difference between the power spectrum at 0 Hz of a normalized power spectrum associated with the target channel and the power spectrum of a tenth lobe of the normalized power spectrum associated with the alternate channel is at least approximately 16 dB. However, other suitable filter structures and bandwidths may be used and filter structures may be adjusted according to other system specifications.

Figure 14:
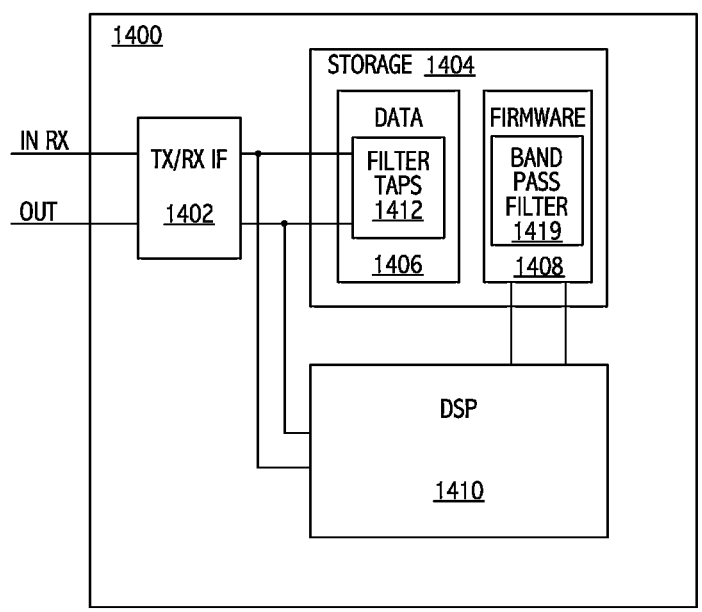
FIG. 14 illustrates a block diagram of a receiver consistent with at least one embodiment of the invention.

Referring to FIG. 14, in at least one embodiment of a communications node (e.g., communications node 1400), at least one digital function of the receiver portion described above (e.g., preamble detection and synchronization 1106, target channel detector 1108, or band-pass filter 1112) is implemented using instructions (e.g., firmware 1408) to implement those functions and a processor circuit (e.g., digital signal processor 1410) configured to execute those instructions, which may include storage or be coupled to a storage device (e.g., storage 1404). For example, digital signal processor 1410 and storage 1404 implement band-pass filter 1112 by executing a band-pass filter routine (e.g., firmware 1408 and predetermined filter taps 1412) loaded from a computer-readable medium (e.g., storage device 1404).

While circuits and physical structures are generally presumed, it is well recognized that in modern semiconductor design and fabrication, physical structures and circuits may be embodied in computer-readable descriptive form suitable for use in subsequent design, test or fabrication stages. Structures and functionality presented as discrete components in the exemplary configurations may be implemented as a combined structure or component. The invention is contemplated to include circuits, systems of circuits, related methods, and computer-readable medium encodings of such circuits, systems, and methods, all as described herein, and as defined in the appended claims. As used herein, a computer-readable medium includes at least disk, tape, or other magnetic, optical, semiconductor (e.g., flash memory cards, ROM), or electronic storage medium.

The description of the invention set forth herein is illustrative, and is not intended to limit the scope of the invention as set forth in the following claims. For example, while the invention has been described in an embodiment implementing the IEEE 802.15.4 standard system, one of skill in the art will appreciate that the teachings herein can be utilized with devices implementing other communications protocols supporting other frequency bands including multiple channels. Variations and modifications of the embodiments disclosed herein, may be made based on the description set forth herein, without departing from the scope and spirit of the invention as set forth in the following claims.

What is claimed is:

1. A method comprising:
   filtering a received signal to generate a band-pass filtered signal using a band-pass filter having a pass-band including frequencies located within a central lobe of a power spectrum associated with a target channel of a plurality of channels supported by a communications system and approximately centered at a frequency of a null of a power spectrum associated with at least one other channel of the plurality of channels supported by the communications system, wherein the at least one other channel includes at least one of an alternate channel and an adjacent channel of the plurality of channels; and
   processing the received signal based on the band-pass filtered signal, wherein processing the received signal comprises:
      determining whether the received signal is received over one of the alternate channel and the adjacent channel at least partially based on a total power level of the band-pass filtered signal; and
      enabling demodulation of the received signal according to the determination.

2. The method, as recited in claim 1, wherein processing the received signal includes generating an indicator of the total power level of the band-pass filtered signal.

3. The method, as recited in claim 1, wherein processing the received signal further comprises:
   comparing the total power level of the band-pass filtered signal to a power level of the received signal, and at least partially basing the determination thereon.

4. The method, as recited in claim 1, wherein the processing the received signal comprises:
   generating a logarithmic total power measurement of the received signal;
   generating a logarithmic total power measurement of the band-pass filtered signal; and
   generating a difference between the logarithmic total power measurement of the band-pass filtered signal and the logarithmic total power measurement of the received signal to generate a power difference signal.

5. The method, as recited in claim 4, wherein the processing the received signal further comprises:
   comparing the power difference to a threshold and basing the determination thereon.

6. The method, as recited in claim 1, wherein the at least one other channel includes at least an alternate channel of the plurality of channels and the band-pass filter has a 3 dB point at a corresponding frequency where a difference between the power spectrum at 0 Hz of a normalized power spectrum associated with the target channel and the power spectrum of a tenth lobe of the normalized power spectrum associated with the alternate channel is at least approximately 16 dB.

7. The method, as recited in claim 1, wherein the pass-band is less than approximately 10% of the frequency band of the main lobe of the target channel.

8. The method, as recited in claim 1, wherein the pass-band is approximately centered around a frequency of a null between a $9^{th}$ and $10^{th}$ lobe of the power spectrum associated with an alternate channel of the plurality of channels.

9. The method, as recited in claim 1, wherein the pass-band is approximately centered around a frequency of a null between a $4^{th}$ and $5^{th}$ lobe of the power spectrum associated with an adjacent channel of the plurality of channels.

10. An apparatus comprising:
   a band-pass filter configured to generate a band-pass filtered version of a received signal having a pass-band including frequencies located within a central lobe of a power spectrum associated with a target channel of a plurality of channels supported by a communications system and approximately centered at a frequency of a null of a power spectrum associated with at least one other channel of the plurality of channels supported by a communications system; and
   a control circuit configured to generate an indicator of whether the received signal is received over the target channel at least partially based on a power level of the band-pass filtered version of the received signal and a power level of the received signal; and a demodulator configured to demodulate the received signal based on the indicator.

11. The apparatus, as recited in claim 10, wherein the control circuit comprises:

a comparison circuit configured to compare a threshold value to a ratio of the total power level of the received signal to the total power level of the band-pass filtered version of the received signal and generate the indicator based thereon.

12. The apparatus, as recited in claim 10, wherein the control circuit comprises:

a first circuit configured to convert the total power level of the received signal to a logarithmic version of the total power level of the received signal level;

a second circuit configured to convert the band-pass filtered version of the power level of the received signal to a logarithmic version of the total power level of the band-pass filtered signal; and a difference circuit configured to generate a difference between the logarithmic version of the total power level of the band-pass filtered signal from the logarithmic version of the total power level of the received signal to thereby generate the ratio.

13. The apparatus, as recited in claim 11, wherein the at least one other channel includes at least an alternate channel of the plurality of channels and the band-pass filter has a 3 dB point at a corresponding frequency where a difference between the power spectrum at 0 Hz of a normalized power spectrum associated with the target channel and the power spectrum of a tenth lobe of the normalized power spectrum associated with the alternate channel is at least approximately 16 dB.

14. The apparatus, as recited in claim 11, wherein the band-pass filter is approximately centered around a null between a $9^{th}$ and $10^{th}$ lobe of the power spectrum associated with an alternate channel of the plurality of channels.

15. The apparatus, as recited in claim 11, wherein the band-pass filter is approximately centered around a null between a $4^{th}$ and $5^{th}$ lobe of the power spectrum associated with an adjacent channel of the plurality of channels.

16. A method comprising:

determining whether a received signal is received over a target channel of a plurality of channels supported by a communications system at least partially based on a power level of a band-pass filtered version of the received signal; and demodulating the received signal according to the determination, the received signal being demodulated in response to a determination that the received signal is received over the target channel and the received signal being rejected prior to demodulation in response to a determination that the received signal is not received over the target channel.

17. The method, as recited in claim 16, further comprising:

filtering the received signal to generate the band-pass filtered version of the received signal using a band-pass filter having a pass-band including frequencies located within a central lobe of a power spectrum associated with the target channel supported by a communications system and approximately centered at a frequency of a null of a power spectrum associated with at least one other channel of the plurality of channels supported by the communications system.

18. The method, as recited in claim 17, wherein the at least one other channel includes at least an alternate channel of the plurality of channels and the band-pass filter has a 3 dB point at a corresponding frequency where a difference between the power spectrum at 0 Hz of a normalized power spectrum associated with the target channel and the power spectrum of a tenth lobe of the normalized power spectrum associated with the alternate channel is at least approximately 16 dB.

* * * * *